UNITED STATES PATENT OFFICE.

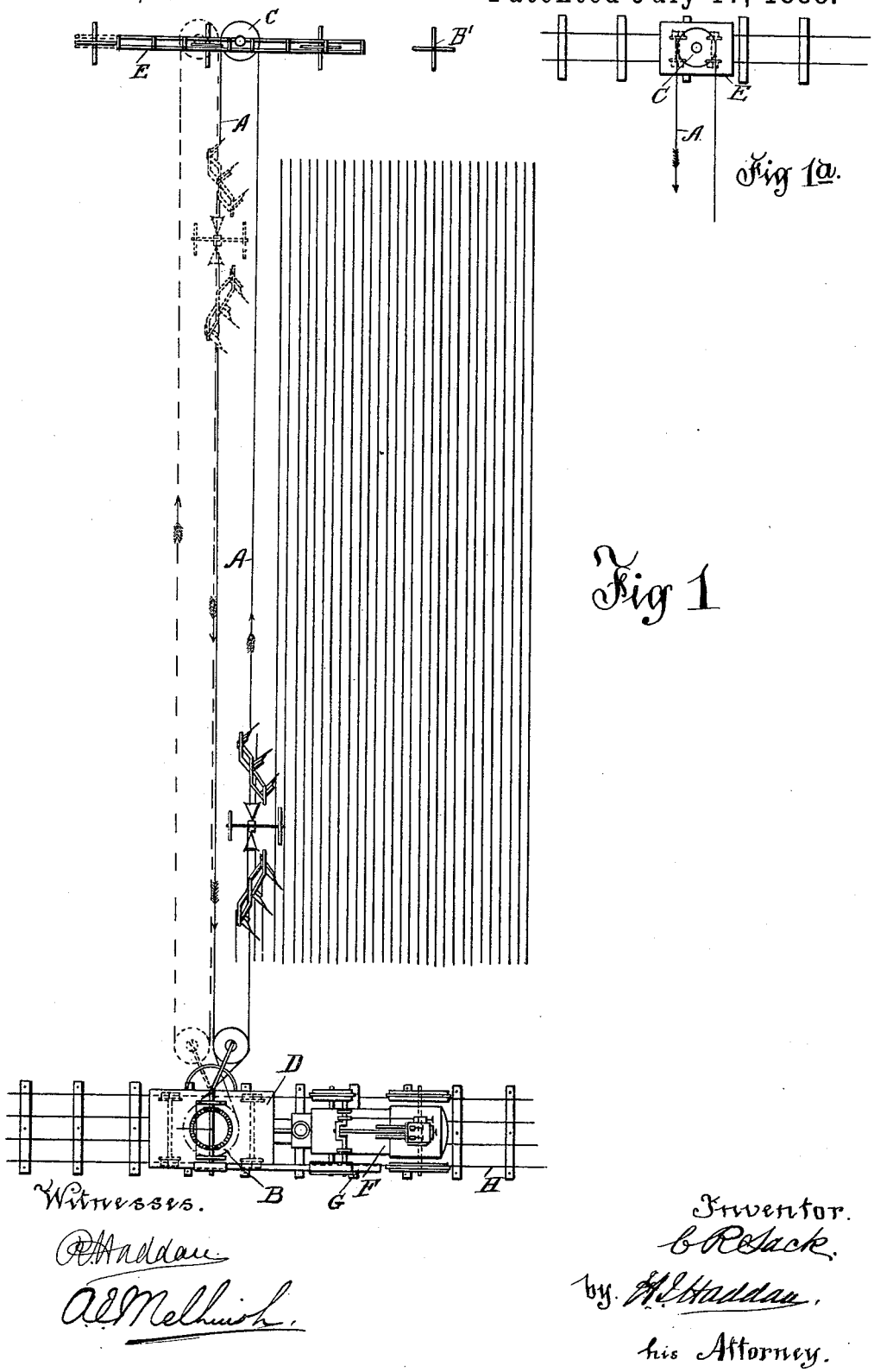

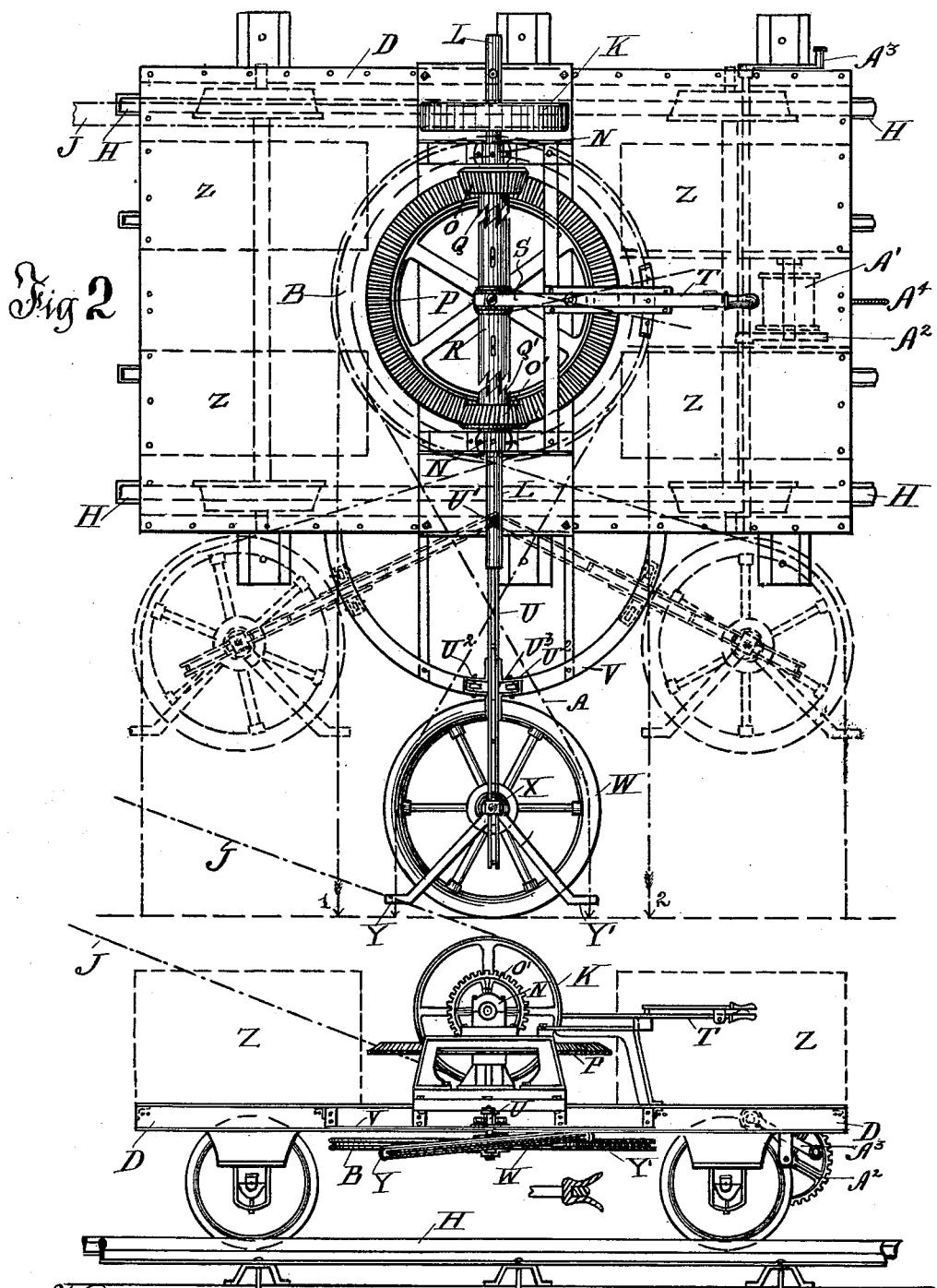

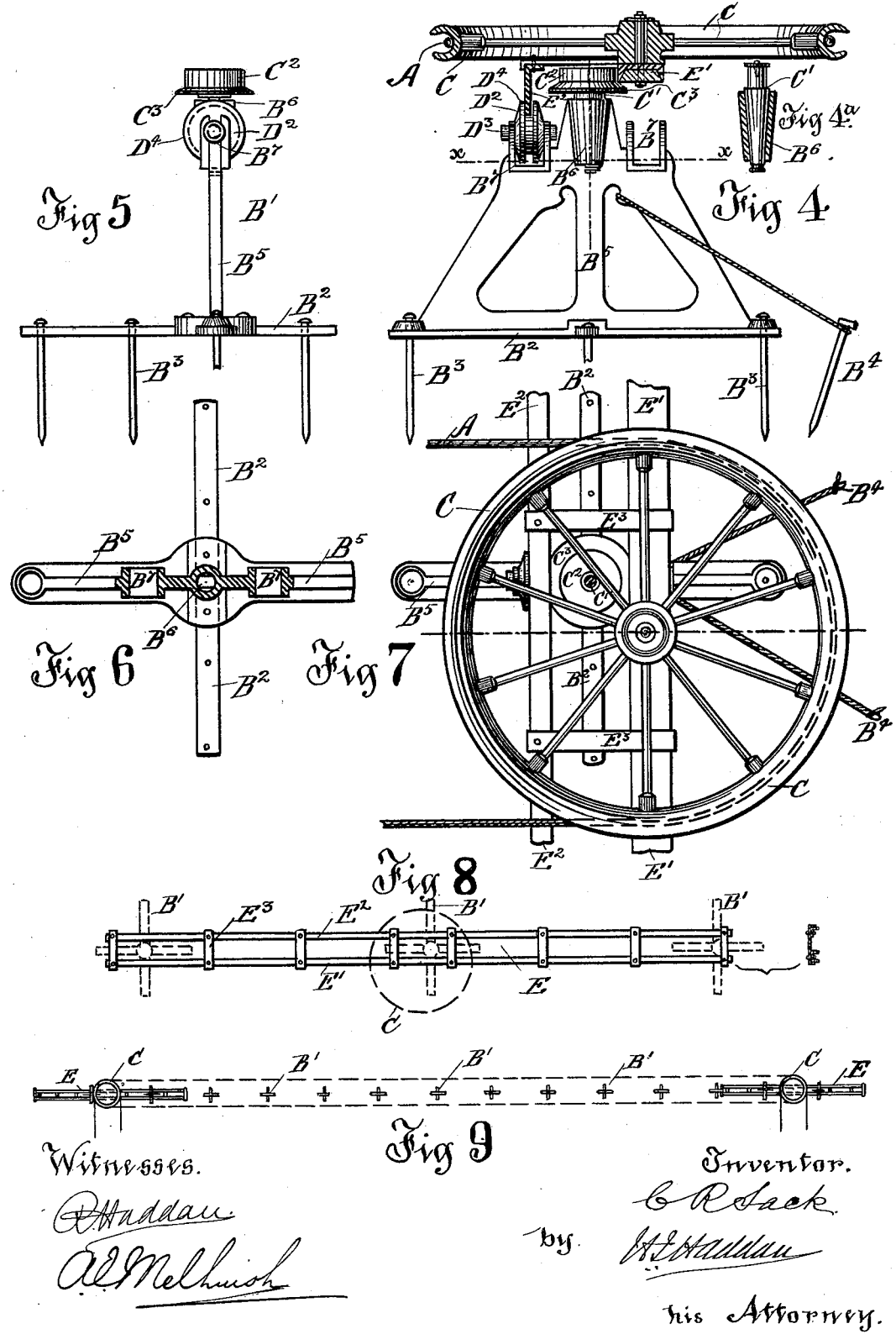

CHRISTIAN RUDOLPH SACK, OF LEIPSIC, GERMANY.

STEAM-CULTIVATOR.

SPECIFICATION forming part of Letters Patent No. 386,161, dated July 17, 1888.

Application filed January 3, 1888. Serial No. 259,724. (No model.)

*To all whom it may concern:*

Be it known that I, CHRISTIAN RUDOLPH SACK, a subject of the German Emperor, and a resident of Leipsic, in Germany, have invented a new and useful Improvement in Steam-Cultivators, of which the following is a specification.

This invention relates to the cultivation of land; and it consists in improved machinery, hereinafter described, whereby plows, harrows, reapers, and such like implements may be drawn over the land. The said machinery is illustrated in the accompanying drawings, in which—

Figure 1 illustrates in plan view a portion of ground with plow drawn thereover by intervention of improved machinery. Fig. 1$^a$ is a modification of a part of the said machinery, as shown in Fig. 1. Fig. 2 is a plan view of one of the pulley-carriages constituting one of the machines. Fig. 3 is an elevation thereof. Fig. 4 is a sectional elevation of a second pulley-carriage and an elevation of one of the supports therefor. Fig. 5 is a side elevation of said support. Fig. 6 is a horizontal section on line $xx$, Fig. 4. Fig. 7 is a plan view of part of the said second pulley-carriage, showing the support thereunder. Fig. 8 illustrates on smaller scale, in plan, the frame of said second pulley-carriage, with supports in dotted lines below. Fig. 9, on yet smaller scale, illustrates the manner in which the supports are set out to form a continuous track.

The plow-carriage or other implement is drawn over the field by means of an endless rope, A, the same being carried on two pulleys, B and C, one at each side of the field, and mounted on carriages D E, whereby they may be moved in parallel directions along the field. One of said pulleys, B, serves to drive the plow, and this pulley is carried on a suitable truck, D, coupled to a locomotive-engine, F, whereby the said truck is moved along the field and the pulley B thereon driven for the moving of the plow-carriage across the field. Preferably a rail-track, H, is laid along the field in the direction in which the locomotive and pulley-truck are to be moved, and, if the locomotive be a traction-engine of construction generally employed in agriculture, tires of ⌶ or ⌊ iron are temporarily fixed on the peripheries of the wheels, to enable the engine to run upon such rails. If the opposite pulley-carriage be also a truck running upon rails, as in Fig. 1$^a$, or if it be such as hereinafter described, the two pulleys will always remain parallel and the endless rope A passing over them at an equal and necessary tension. The engine F carries the driving-pulley G, the same geared by belt J with the pulley K upon shaft L, journaled in bearings N N on the truck D. On said shaft are loosely revoluble two beveled wheels, O O', gearing with the large beveled wheel P. Said wheels O O' have on their inner sides clutch-teeth Q Q', and on the shaft L is a sleeve, R, splined to revolve with said shaft, and having clutch-teeth at each end, whereby it is adapted to engage with the teeth Q or Q', so that the respective beveled wheel, O or O', may be geared with the shaft L, and the beveled wheel P revolved thereby in one or other direction. The shaft of the bevel-wheel P carries the rope-pulley B, and the rope A may therefore be drawn in either direction. The sleeve R is controlled by the fork S on the lever T in the usual manner.

Since the rope A would be liable to slip if passed around the pulley B only, the pulley W, revolubly held on a pin adapted to be fixed at a suitable distance on the arm U, is arranged so that the rope may be crossed thereover, as shown in Fig. 2. The rope is prevented from trailing off the groove of this pulley by the arms Y Y'. The pulley W is preferably somewhat inclined to the horizontal plane, so that friction at the crossing of the rope is avoided. The arm U is pivoted at U' to the frame of the truck D, and is capable of being moved about its pivot in a horizontal plane. It is supported by the semicircular rail V, and runs thereon by means of wheels $U^2$, journaled in block $U^3$. It will be seen from the dotted-line representation in Fig. 2 that when the rope A is drawn in the direction of the arrows 1 or 2 the wheel W and arm U are drawn automatically to one side or the other more or less, according to the difference of strain on the two lengths of the rope A.

To enable the locomotive to act simply for driving the pulley B and not for the moving of the truck, I provide on the latter a windlass consisting of a drum, A', capable of being rotated by power through tooth-gear A², and hand-levers A³ for the coiling thereon of the rope A⁴, which may be anchored along the track, and thus for drawing the truck and locomotive along the track when desired. The weight Z, which may be boxes full of sand or ballast, pig-lead, or other weighty material, serves to hold the truck firmly against the lateral pressure produced by drawing the plow or other instrument through or over the ground. The opposite or remote bight of the rope A is carried by the pulley C on the truck or carriage E. This truck may be a simple truck running on rails laid across the field, as in Fig. 1ª, or it may be of the following construction and supported in the manner hereinafter described with reference to Figs. 5 to 9.

Along the line to be followed by the pulley C are arranged at desirable and equal distances apart frames B', consisting of a firm base-plate, B², firmly spiked and anchored down by spikes B³ and anchor-spikes B⁴. On said base-plate is a vertical frame, B⁵, so arranged as to best withstand the force of the plowing. In said frame is a central vertical, preferably conical, socket, B⁶, and laterally thereof on each side horizontal sockets B⁷. The vertical socket serves to receive a pin, C', bearing revolubly on the upper end thereof a wheel, C², having on its lower edge a flange, C³. The horizontal or lateral sockets B⁷ serve to receive wheels D², provided with gudgeons D³ D³, lying in bearings on the sides of the sockets. The wheels D² have on each edge of their peripheries flanges D⁴ D⁴. The sockets are similar for all the supports B', so that the pin C', with wheel C² and the wheels D², may be arranged in any of the series. The pulley C is pivoted centrally on a frame, E, consisting of two rails is E' E², connected together at intervals by cross-strips E³. The rail E² is an angle-iron, the lower edge of which runs on the wheels D² aforesaid. The rail E' is a flat rail having a side bearing-surface adapted to rest against the wheel C² on the side remote from the plow, so that the pull of the latter is met by the bearing of the rail E², firmly on the wheel C².

The frame E is preferably of such length and the supports B' are at such distance apart that the frame may extend over three supports in the manner shown in Fig. 8. In moving it along the track formed by said supports it will never be supported by less than two supports, and will therefore be always held in line. It will be seen that at least three wheels D² and three pins C', with wheels C², are required. As the frame E is moved along the track the said wheels may be taken from the support just left and placed on the one over which the frame is about to pass. When plowing, &c., over that part of the field which lies to the other side of the track of supports B', the frame E is reversed and the wheels D² are arranged in the corresponding sockets, B⁷, on that side of the track.

Having now described my invention, I claim—

1. In steam-cultivators, the combination, on a movable carriage, of a horizontal pulley, B, beveled wheel P on shaft of said pulley, shaft L, pulley K on said shaft, bevel-wheels O O', and clutch mechanism Q Q' R S T, together with pulley W and pivoted arm U, substantially as set forth.

2. In steam-cultivators, a movable engine, a carriage having pulley B adapted to be driven by power in either direction by said engine, and having pulley W and arm U, as set forth, and a windlass, A' A² A³, on said carriage, in combination with carriage E, pulley C, and endless rope A, substantially as and for the purpose set forth.

3. In steam-cultivators, the combination of a series of blocks, B', having sockets for the reception of wheels adapted to be revolubly supported in said sockets, a frame, E, adapted to run on said wheels, and pulley C on said frame, substantially as and for the purpose described.

In testimony whereof I have signed this specification in the presence of two subscribing witnesses.

CHRISTIAN RUDOLPH SACK.

Witnesses:
 EDMUND BACH,
 MAX MATTHÄI.